MORTIMER W. JEFFORDS.
Improvement in Saws.
No. 118,370.          Patented Aug. 22, 1871.
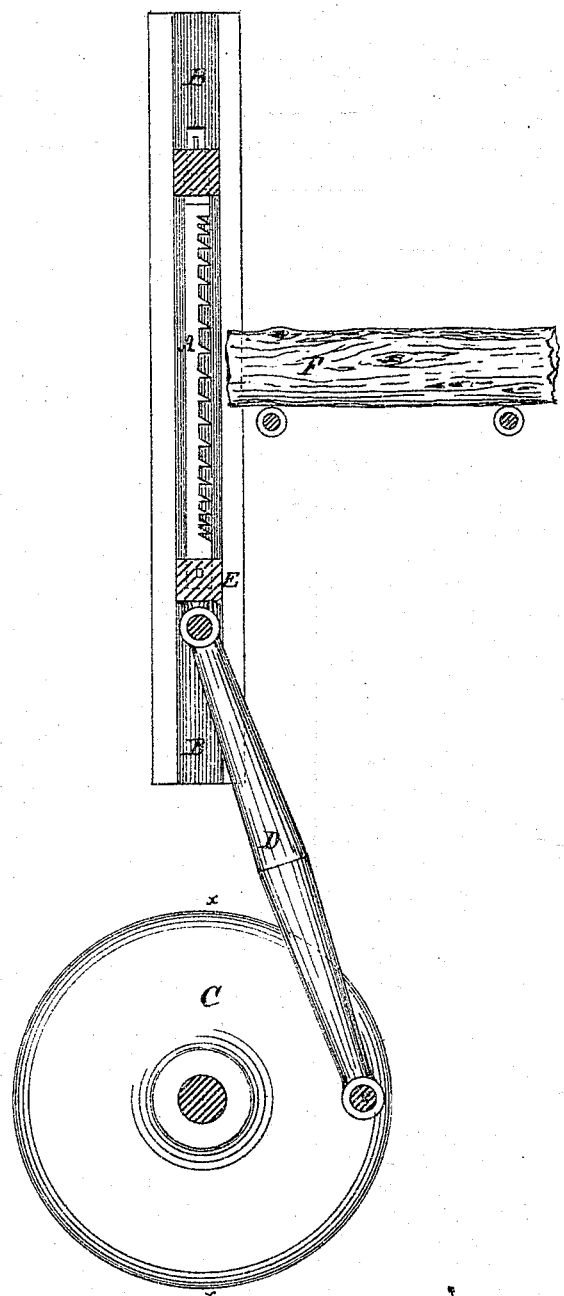

UNITED STATES PATENT OFFICE.

MORTIMER W. JEFFORDS, OF MUSKEGON, MICHIGAN.

IMPROVEMENT IN SAWS.

Specification forming part of Letters Patent No. 118,370, dated August 22, 1871.

*To all whom it may concern:*

Be it known that I, MORTIMER W. JEFFORDS, of Muskegon, in the county of Muskegon and State of Michigan, have invented a new and useful Improvement in Reciprocating Saws; and I do declare that the following is a true and accurate description thereof, reference being had to the accompanying drawing and to the letters of reference marked thereon, and being a part of this specification, in which is represented a view, partly in section, of the saw and its connections.

The object of this invention is to adapt the ordinary reciprocating saw to a crank motion, so that, with a constant feed, the varying speed of the saw will be compensated for by the increased cutting capacity. Where a crank and pitman are made use of to give motion to a reciprocating saw the saw moves with a varying speed, the variation being dependent upon the position of the crank, viz., at the dead-points the motion is represented by zero, and as the crank leaves the dead-point the saw increases in speed until the maximum is reached, at a point on the crank-circle half-way between the dead-points. After leaving this point the speed decreases until the other dead-point is reached. Now, the power of the saw increases in proportion to the decrease of speed; and my invention consists in so spacing the distance between the points of the teeth along the saw that where the power is greatest and the speed least the teeth shall be closest together, and vice versa.

To enable those skilled in the art to make and use my invention, I will proceed to describe the same with particularity, making use, in so doing, of the aforesaid drawing.

A is the saw, moving in the ordinary vertical guide-way B. C is an ordinary crank-wheel, to the wrist-pin $c$ of which is attached a pitman, D, connected to the saw-frame as at E, operating to give the saw a reciprocating up-and-down motion. F is the log to be cut, fed forward with a regular motion upon the rollers G or upon an ordinary carriage. The feed should be constant and regular, and capable of being governed at will.

It will be seen that the teeth of the saw are of the same length throughout, but are so spaced that the points or cutting-edges are closer together at the ends of the saw than in the middle, the distance from point to point increasing in a regular ratio from the ends of the saw to the middle.

A good way to lay off a saw of this kind and to ascertain the exact distance the cutting-points should be apart along the entire length of the saw is to take a semi-diameter equal to the semi-diameter of the crank-circle and describe with it a circle. Divide the one-half of this circle into any given number of equal parts which shall be equal to the greatest distance between the teeth. Now draw a line parallel to the radiuses which conclude the half circle, or, in other words, tangential to the half circle, at a point half-way between the terminuses of the divided portion; and lines drawn at right angles to this tangent from the points on the circle will cut the tangent at points along its length, which will be the points at which the edge of the teeth should stand in relation to each other.

The drawing exhibits the crank at the point where greatest speed is given to the saw—that is to say, half-way between the dead-points $x\ x$. It will be seen that the saw is now half-way down, and the teeth, which are in a position to engage the log, are much further apart than at either end. The teeth are made of the same depth throughout the entire length of the saw, so that plenty of room is allowed for the escape of sawdust. By this construction each tooth is given its proper proportion of cutting to do, and is given a certain time in which to do it, as the feed is regular and the log is not crowded up to the teeth faster than the cutting is accomplished.

In ordinary saws the log is fed up to the teeth with a constant and regular motion, but the saw moves with a varying speed, and consequently some of the teeth, being overcrowded with feed, rip or tear their way through the wood, to the detriment both of the saw and of the timber. By arranging and spacing the teeth according to my invention this difficulty is obviated.

I am aware that saws have been constructed with teeth increasing regularly in width and length from the bottom to the top of the saw, and disclaim the invention of such.

Having thus described my invention, what I claim, and desire to secure by Letters Patent, is—

A reciprocating or up-and-down saw, constructed with teeth of equal length, so spaced as to increase in number from the center regularly toward both ends of the saw, substantially as described and shown, and for the purpose specified.

M. W. JEFFORDS.

Witnesses:
   DAVID D. ERWIN,
   C. ORRIN JEFFORDS.